United States Patent

[11] 3,563,401

[72] Inventor Peter F. Gandolfo
 Wellesley, Mass.
[21] Appl. No. 748,284
[22] Filed July 29, 1968
[45] Patented Feb. 16, 1971
[73] Assignee Hyster Company
 Portland, Oreg.

[54] HINGED OVERHEAD GUARD FOR TRUCK
 3 Claims, 9 Drawing Figs.
[52] U.S. Cl. .................................................. 214/672;
 280/150
[51] Int. Cl. .................................................. B66f 9/20
[50] Field of Search .................................. 214/(Truck
 Guard Digest), 660, 670—674, 620—621, 513;
 280/150C; 296/102

[56] References Cited
 UNITED STATES PATENTS

| | | | |
|---|---|---|---|
| 2,806,618 | 9/1957 | Cook | 214/672 |
| 2,911,232 | 11/1959 | Hastings et al. | 280/150(C) |
| 2,962,179 | 11/1960 | Molitor et al. | 214/670 |
| 3,066,818 | 12/1962 | Simpson | 214/671 |
| 3,188,111 | 6/1965 | Ells et al. | 214/672X |
| 3,259,211 | 7/1966 | Ryskamp | 280/150(C) |
| 3,289,871 | 12/1966 | LaTourneau et al. | 214/674 |
| 3,336,074 | 8/1967 | Barnes et al. | 280/150(C) |
| 3,374,909 | 3/1968 | Ferwerda | 214/671 |

FOREIGN PATENTS

| | | | |
|---|---|---|---|
| 1,265,317 | 5/1961 | France | 296/102 |

*Primary Examiner*—Gerald M. Forlenza
*Assistant Examiner*—Raymond B. Johnson
*Attorney*—Chittick, Pfund, Birch, Samuels & Gauthier ABSTRACT: The invention relates to material-handling trucks having a guard of substantial strength positioned above the operator's area to protect the operator against falling objects. The guard, which is normally higher than the minimum height of the truck mast, is mounted on the truck in such manner that it may be lowered to a position behind the operator thereby reducing the overall height of the truck to an extent sufficient to permit the truck to go through lower doorways than possible with the guard in normal overhead protective position.

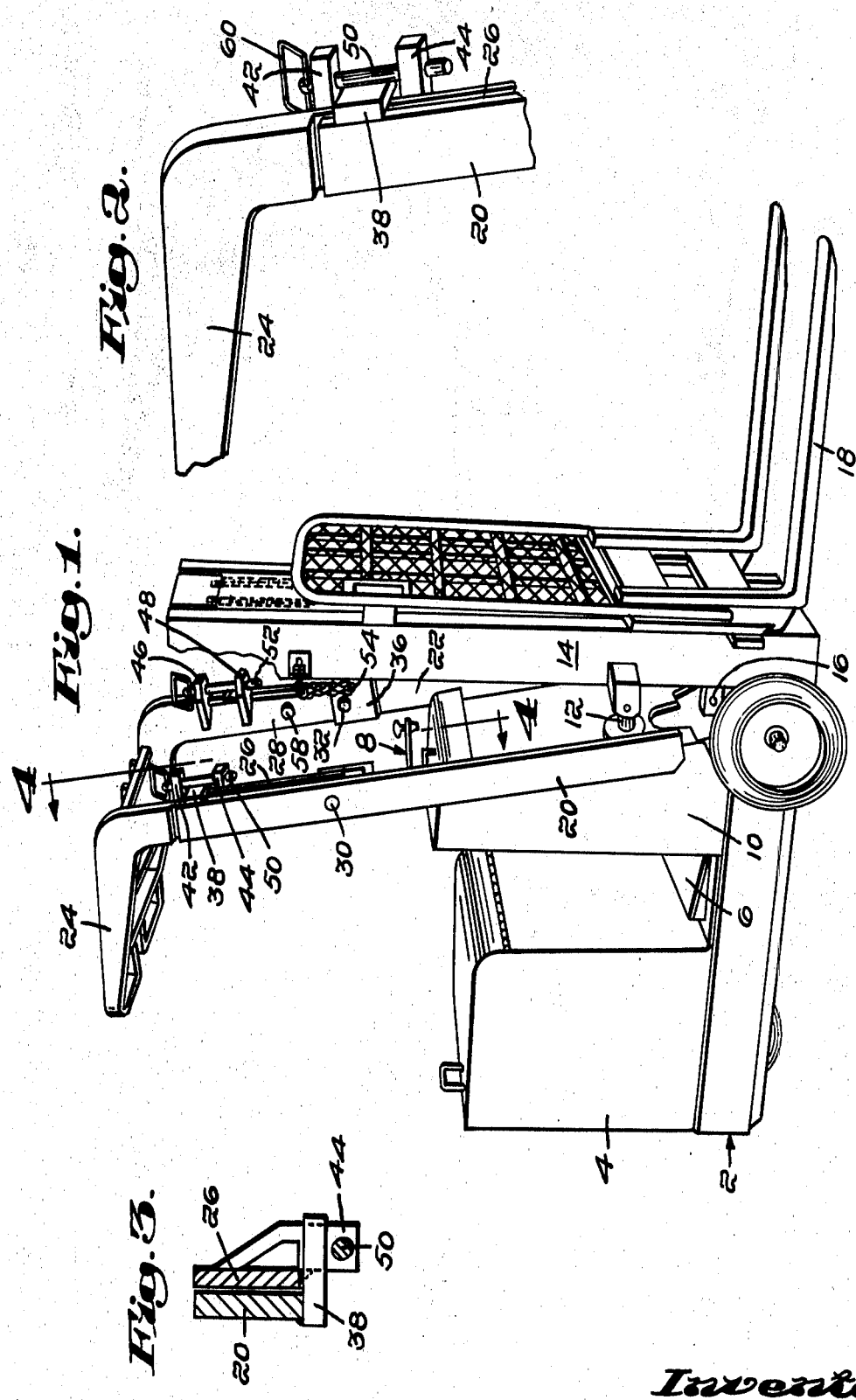

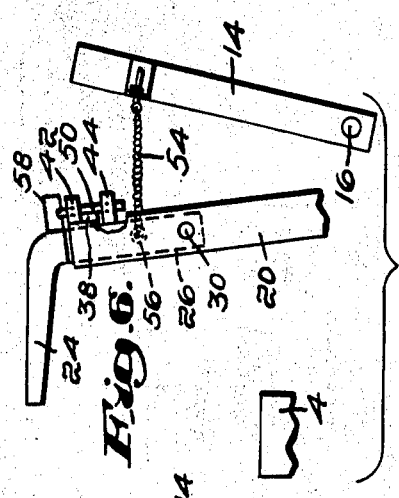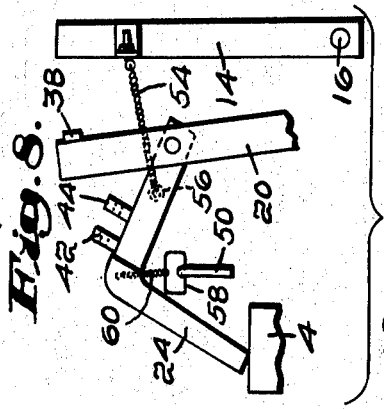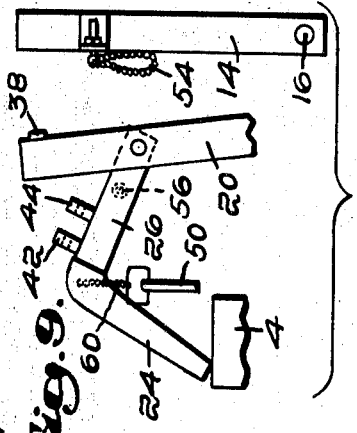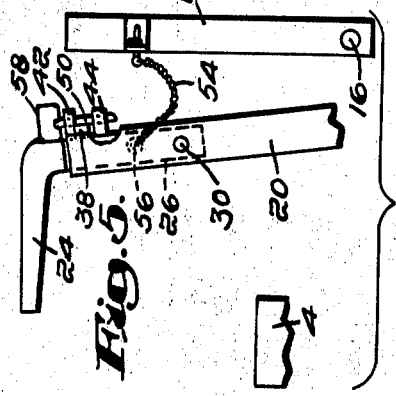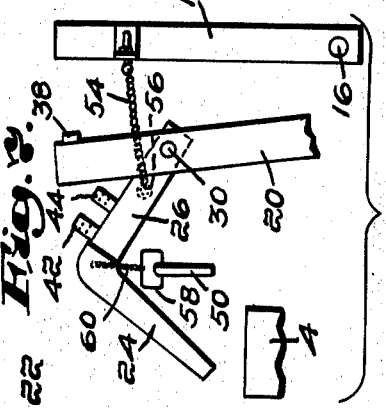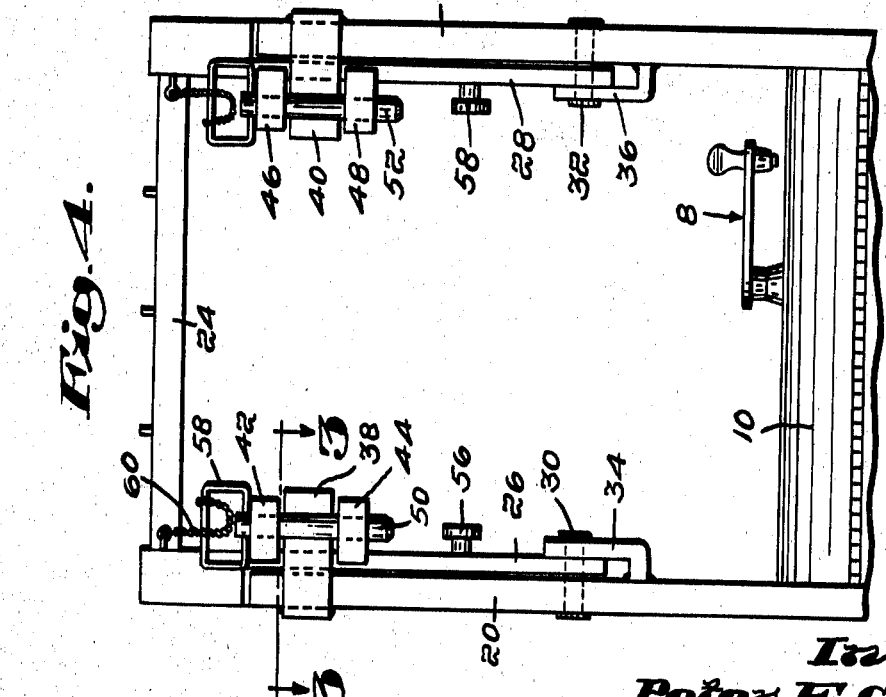

HINGED OVERHEAD GUARD FOR TRUCK

CROSS REFERENCES TO RELATED APPLICATIONS

None.

BACKGROUND OF THE INVENTION

Material-handling trucks capable of picking up loads at floor level and raising them to substantial heights for use in storage and warehouse facilities have long been in use. The trucks often have to be driven in location where there is the possibility of articles stored overhead falling and possibly injuring the truck operator. This hazard has been so serious that it has been customary to attach to the truck an overhead protective guard located above the position occupied by the operator. In fact, such guards have been made mandatory by statute in many states. Since the guard must be high enough to clear the head of the tallest operator, the top of the guard will ordinarily be a substantially greater distance above the floor than the minimum height of the truck mast, whether a one-part, two-part, or three-part mast. Thus, a conventional truck, having an overhead guard for the operator, has been unable to pass through doorways as low as those which trucks without the overhead guard can pass through. Such lower doorways might be, for example, the doorways into box cars.

Accordingly, it has heretofore been necessary to use trucks without overhead guards where the doorways are low, but such trucks then could not be used in those dangerous locations in which state statutes require the use of an overhead guard. The problem thus has been how to provide all trucks with suitable overhead guards when used in dangerous locations, and at the same time permit ready removability, or lowering of the guard to reduce the truck height enough to pass through low doorways where there is no necessity for an overhead guard.

SUMMARY OF THE INVENTION

The guard has been constructed to meet the above requirements by having its legs pivoted to supporting members that extend upwardly from the truck. Latching mechanism holds the guard in its upper protective position, but when the guard is to be lowered to reduce the overall height of the truck, such lowering is accomplished through the utilization of the conventional mast-tilting mechanism. Connection is made between the legs of the guard and the tiltable mast preferably by a chain or chains fastened at one end to the mast and at the other end to the legs. Upon release of the latching mechanism, rearward movement of the mast (controlled by the operator) permits downward swinging movement of the overhead guard to a position to the rear of the operator.

It will be understood in the discussion that follows that two chains are normally used. For convenience, however, reference hereinafter may, on occasion, be made to one chain only.

When the guard is in its downward position and resting on a fixed part of the truck which may be considered as constituting a stop, the chain may be readily disconnected from the guard leg permitting the mast to be swung forward to its normal operating position. When the guard is to be raised to protecting position, the chain attached to the mast is reconnected to the leg of the guard; then, when the mast is swung forward, the guard will be raised to protective position above the operator's area and latched in this position. The chain is then again disconnected from the guard leg so that the mast is free to perform its normal functions in relation to the loads being lifted.

Obviously, the operating connections between the mast and the legs of the guard could be varied. For example, instead of using chains which would be connected to the guard legs above the pivot point, compression members could be used which could be connected to downward extensions of the legs below the pivot point. Generally, however, the tension members are to be preferred because they connect with the mast at a higher level where the mast movement is greater for the same degree of rotation.

Any suitable type of latching mechanism may be used to hold the legs of the guard in fixed relation to the supports on which they are pivoted. Preferably, positive stops will be provided so that when the legs are pulled to upright position by the mast, the stops will be engaged. At this position, the latching mechanism will be actuated. In certain situations, the guard might be held in upright position by the tension chains without utilizing the latch mechanism. This however, would be only a temporary expedient because it would then preclude any tilting of the mast while the guard was in protective position.

BRIEF DESCRIPTION OF THE DRAWINGS

FIG. 1 is a perspective view of a material-handling truck of the type with which the invention is of particular utility. The protective guard is shown in its normal effective position above the operator's area. The guard is latched in fixed relation to the permanent supports extending upwardly from the truck body.

FIG. 2 is an enlarged fragmentary view of one form of stop and latching means.

FIG. 3 is a section taken on the line 3-3 of FIG. 4.

FIG. 4 is a vertical elevation of the mechanism taken on the line 4-4 of FIG. 1.

FIGS. 5 to 9 represent a succession of views showing the steps followed in lowering the guard from its normal protecting position to a lower position which, in this case, is below the top of the mast.

In FIG. 5 the chain connected to the mast has been hooked onto a leg of the guard.

In FIG. 6 the mast has been moved upward to apply tension to the chain and to pull the legs of the guard against the stops so that the latching means may be readily released.

In FIG. 7 the mast has been moved to the rear and the guard under its own weight has turned downwardly.

In FIG. 8 the guard has come to rest on a portion of the truck which acts as a stop.

In FIG. 9 the chain has been disconnected from the guard leg after the mast has been moved an additional distance to the rear from the position of FIG. 8 to cause sufficient slack in the chain.

DESCRIPTION OF THE PREFERRED EMBODIMENT

Referring first to FIG. 1, there is shown a typical material-handling truck 2. This includes a rear body portion 4 in which the batteries and steering wheel are located. An operator's area is indicated at 6 on which the operator normally stands while he is operating the steering mechanism and controls generally indicated at 8. The forward part of the truck may be referred to as the cab or dash 10 within which is located suitable hydraulically actuated pistons 12 pivotally connected at their outer ends to a mast 14. The lower end of the mast is pivoted to the truck at 16 whereby extension and retraction of the pistons 12 will cause alternate swinging of the mast 14 to the right and left about the pivot 16.

The mast 14 is representative of any type of conventional mast whether it be a single part, two-part or three-part mast. The mast construction and the fork 18 movable thereon are conventional and constitute no part of the invention except insofar as the forward and backward movement of the mast 14 is necessary to shift and control the position of the overhead guard.

Attached to the forward part of the truck are two upwardly extending supporting members 20 and 22. These members are fixed on the truck and act as the primary supports for an overhead guard indicated at 24. This guard is preferably made of a strong steel latice work capable of intercepting falling objects that might otherwise hit the operator standing or sitting at the area 6. As shown in FIG. 1, 2, 3 and 4, the guard 24 at its forward end two legs 26 and 28 carried by pivots 30 and 32. The inboard ends of the pivots 30 and 32 are supported by brackets 34 and 36. The supporting members 20 and 22 and the legs 26 and 28 pivoted thereto may hereinafter be referred to as pivotally related members.

Secured to the forward sides of supporting members 20 and 22 are a pair of crosswise extending stops 38 and 40. As can be seen in FIG. 3, which is a section taken on the line 3–3 of FIG. 4, the stop 38 acts as a positive means for limiting the forward swinging movement of the leg 26. Similarly, stop 40 acts to engage the leg 28.

Fastened to the inner sides of legs 26 and 28 are a pair of spaced fingers 42, 44 and 46, 48 which at their forward ends contain aligned holes through which pins 50 and 52 may be dropped when the legs 26 and 28 have been brought to forward position against stops 38 and 40.

With the pins 50 and 52 in position as shown in FIGS. 1, 2, 3 and 4, the overhead guard 24 is securely held in proper protective position on the upwardly extending supports 20 and 22. This is the normal position of the guard during operation of the truck. It will be observed that in this position the top of guard 24 is considerably above the top of the mast 14 which, incidentally, as viewed in FIG. 1, has been broken away in part at its upper end in order not to obscure the stop and latching mechanism related to leg 28.

When the truck reaches a low doorway through which it cannot pass with guard 24 in normal protecting position, the following procedure is undertaken whereby the guard is lowered to a secure position to the rear of the operator, thereby making it possible for the truck to pass through such low doorway.

The procedure in lowering and raising the guard is as follows. For convenience in this explanation, reference will be made only to the several elements associated with the supporting member 20, it being understood that a similar set of elements are related to supporting member 22 which function in identical manner. Referring now to FIGS. 5 to 9, the guard 24 is shown in normal operating position in FIG. 5 with the leg 26 held in fixed relation to supporting member 20 and stop 38 by the latching means comprising the fingers 42 and 44 and pin 50. The mast 14 to which is affixed a chain 54 is moved sufficiently to the rear to permit the free end of the chain to be hooked on to a headed lug 56 extending from the inner side of leg 26. There is a similar lug 58 on leg 28 to which another chain may be connected in like fashion. With the chain 54 now secured to both the mast 14 and the leg 26, the mast is moved forward to the right, as shown in FIG. 6, to place the chain 54 in tension and to pull the leg 26 tightly against stop 38. In this position, the pin 50 is freed of engagement with stop 38 and may be readily withdrawn from fingers 42 and 44. As soon as pin 50 has been withdrawn, the mast 14 is swung to the left, as indicated in FIG. 7, permitting the guard 24 to swing downwardly with the legs 26 and 28 (leg 28 not shown) pivoting about their respective pivots 30 and 32. In order to prevent loss of pin 50, its handle 58 is permanently secured to guard 54 by a chain 60.

Movement of mast 14 is continued to the left until the lower end of guard 24 comes to rest on the top of truck body 4. Thereafter, the movement of mast 14 is continued to the left a sufficient distance to slack the chain 54 sufficiently so that it can be disconnected from lug 56. As soon as the chain has been disconnected, mast 14 is swung to the right to its normal operating position as shown in FIG. 9.

When the guard 24 is to be returned to its normal uppermost protecting position, the reverse procedure is followed. Mast 14, as shown in FIG. 9, is swung to the left sufficiently to permit chain 54 to be connected to lug 56. Mast 14 is then moved to the right placing chain 54 in tension, as shown in FIG. 8, and movement to the right is then continued, as illustrated in FIG. 7, causing the leg 56 to commence swinging upwardly clockwise about pivot 30. Such movement is continued until the leg 26 comes into engagement with stop 38 as shown in FIG. 4. In this position, the pin 50 is dropped through the aligned openings in fingers 42 and 44, to latch the leg 26 in fixed position with supporting member 20. The mast 14 is then moved to the left, as illustrated in FIG. 5, so that chain 54 can be disconnected from lug 56. The guard 24 is then in the proper protective position and the mast 14 is ready to function in its normal manner.

It is intended to cover all changes and modifications of the example of the invention herein chosen for purposes of the disclosure which do not constitute departures from the spirit and scope of the invention.

I claim:

1. A material-handling truck comprising a frame, wheel means including front and rear wheels supportably coacting with said frame for horizontal truck travel, an operator's area on said frame intermediate said front and rear wheels, a driving motor carried by said frame at the rear of said operator's area, a rear housing enclosing said motor, said housing including an upper member adapted to act as a stop and support, a front housing forward of said operator's area containing and supporting truck-operating control elements, a mast carried by and pivoted to the front of said frame, said mast adapted to support a vertically movable load carrying member, means for moving said mast forwardly and rearwardly within limits about its pivots, a pair of laterally spaced upwardly extending supporting members fixed in relation to said frame and front housing, the upper parts of said supporting members having leg pivots affixed therein, said upper parts extending between said mast and said operator's area, the upper ends of said supporting members having a vertical height intermediate the top of said mast and the tope of said front housing, a guard for protecting the operator of the truck, said guard comprising an overhead protecting portion having at its forward end a pair of downwardly extending laterally spaced legs carried by said supporting member leg pivots, said pivots being located on said supporting members at a vertical height above the top of said front housing and above said stop and support member of the rear housing, latch means coacting between said pivotally related supporting members and guard legs for holding said guard legs normally fixed with relation to said supporting members with the overhead protecting portion of said guard normally extending rearwardly from said guard legs over the operator's area and being higher than the minimum height of said mast, said latch means having a stop affixed to one of said pivotally related members to limit the swinging movement of said guard legs toward said mast and means mounted on the other of said pivotally related members selectively cooperating with said stop to hold said guard legs in said normally fixed relation to said supporting members, at least one disconnectable tension member for connecting at least one of said guard legs at a point on said guard legs above said leg pivots to said mast at a point on said mast above the top of said front housing, whereby when said connection has been made and said mast is moved forward to place a strain on said tension member, said latch means can be easily released and said guard will then be held temporarily in the same normal protecting position by said mast and said tension member, the distance from said leg pivots to the rear end of said guard being a distance intermediate the distances from said leg pivots to the rear and to the front of the upper surface of said rear housing, whereby after said latch means has been released and after said mast is moved rearwardly through a small angle within the limit of the travel of said mast to the rear, said guard legs under the turning moment generated by the weight of said overhead guard pivot downwardly through a much greater angle than the mast pivot angle to position the rear end of said guard against said rear housing stop and support member, the guard structure that normally is disposed above said operator's area now being disposed to the rear of said area and entirely below the top of said mast.

2. The material-handling truck of claim 1 wherein said tension member is disconnectable from said guard leg after said guard has engaged said stop and support member whereby said mast can then be moved forward to normal position.

3. The material-handling truck of claim 1 wherein said latch means has spaced elements which straddle said stop and a removable pin extending through apertures in said spaced elements to lock said spaced elements to said stop.